INVENTOR
Wilhelm B. Bronander
BY
Marshall & Hawley
ATTORNEYS

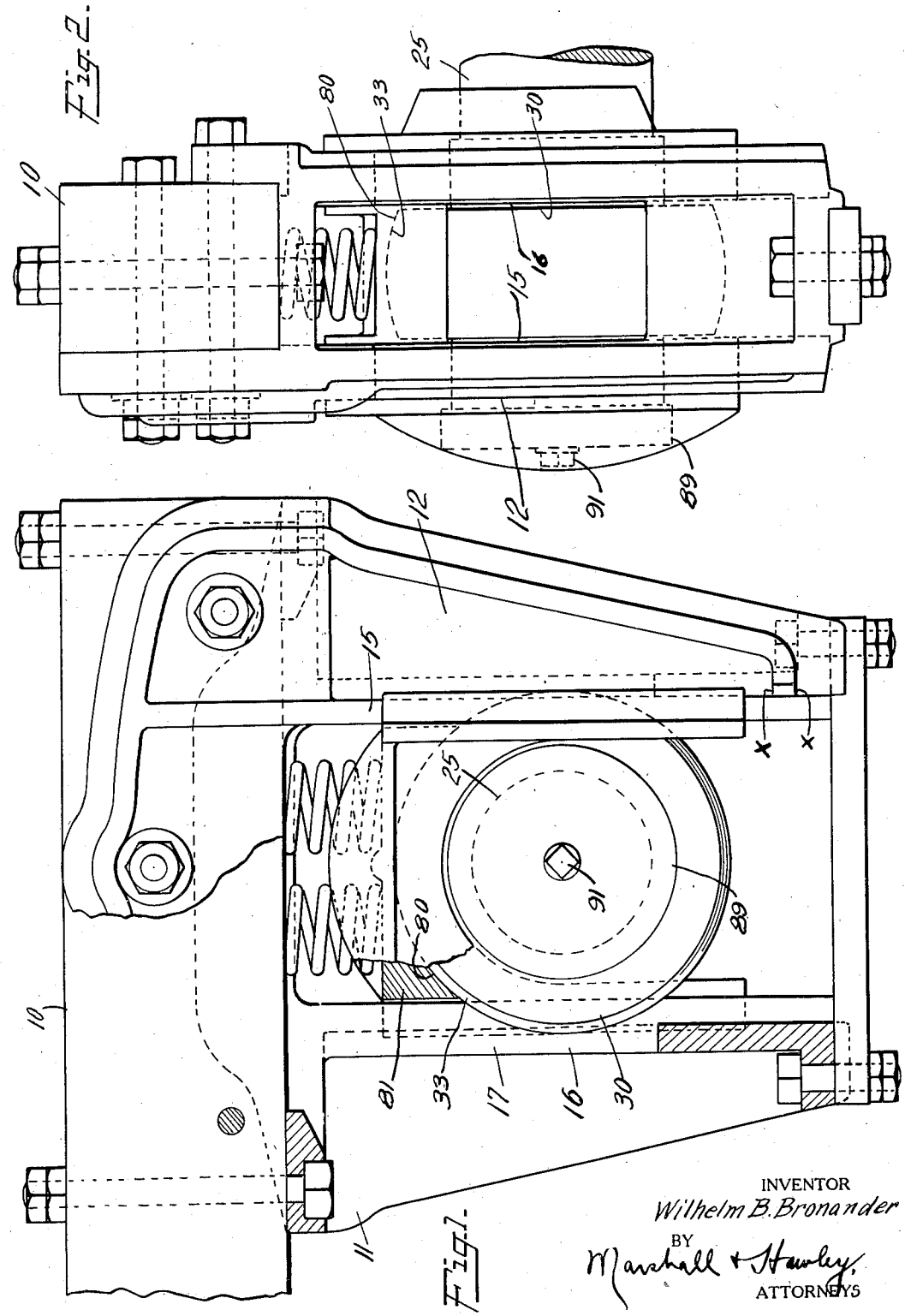

April 1, 1930. W. B. BRONANDER 1,752,777
ROLLER BEARING AND MOUNTING THEREFOR
Filed June 11, 1927 3 Sheets-Sheet 3

INVENTOR
Wilhelm B. Bronander
BY
Marshall & Hawley
ATTORNEYS

Patented Apr. 1, 1930

1,752,777

UNITED STATES PATENT OFFICE

WILHELM B. BRONANDER, OF MONTCLAIR, NEW JERSEY

ROLLER BEARING AND MOUNTING THEREFOR

Application filed June 11, 1927. Serial No. 198,111.

This invention relates to roller bearings and to roller bearing mountings.

The roller bearing and mounting embodying the invention have been particularly developed for heavy vehicles, such as railway trucks and the invention has for its salient object to provide an efficient bearing and a simple and practical mounting for the bearing.

Another object of the invention is to provide a mounting so designed that the bearing can be easily and readily assembled in and removed from its mounting.

Another object of the invention is to provide a bearing so constructed and arranged that it can be reversed, thus lengthening the life of a bearing.

Further objects of the invention will appear from the following specification taken in connection with the drawings, which form a part of this application, and in which Fig. 1 is an elevational view partly in section and partly broken away showing the manner in which the bearing is mounted on a pedestal or supporting frame of a truck;

Fig. 2 is an end elevation of the structure shown in Fig. 1;

The invention briefly described consists of a roller bearing of suitable construction and comprising an inner race and an outer race and rollers mounted between the races. The bearing is mounted between vertical guide frames of a pedestal, the outer race being rotatably mounted in a channel in the pedestal or frames and means being provided on opposite sides of the bearing for slidably supporting the bearing on the pedestal. In one form of the invention, the bearing is mounted in and enclosed by a two-part casing and in another form of the invention, the bearing is mounted in and enclosed by a one piece yoke. Further details of the invention will appear from the following description.

Figs. 1 and 2 illustrate the manner of mounting the bearing on a truck, such as a railway truck. In these views, there is shown a horizontal frame member 10 which has secured thereto a pair of vertical frame members 11 and 12 which form the pedestal in which the bearing is mounted.

Figure 5:
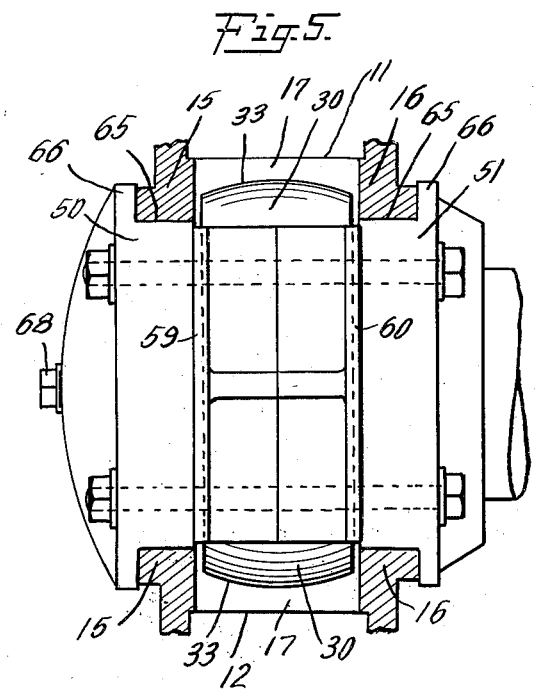
Fig. 5 is a view partly in section and partly in top plan showing the bearing illustrated in Fig. 3.
Figure 6:
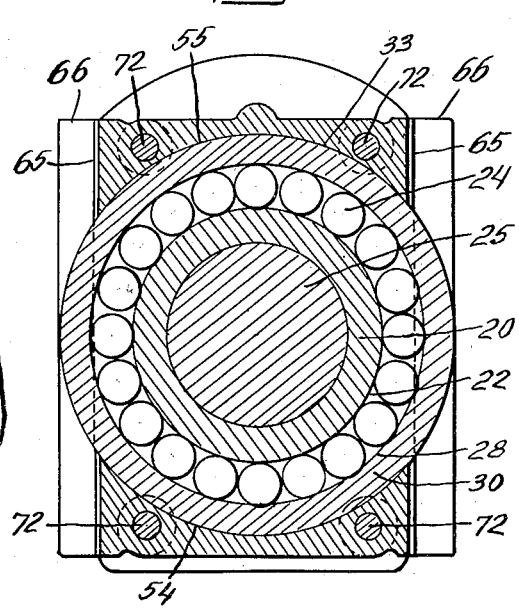
Fig. 6 is a sectional elevation taken substantially on line 6—6 of Fig. 3.

Each vertical frame member as shown in section in Fig. 5 has vertically extending, spaced portions 15 and 16, a vertical channel 17 being disposed between the portions 15 and 16.

Any suitable form of roller bearing may be utilized and in the form of the invention shown in Figs. 3 to 6 inclusive, there is illustrated a bearing comprising an inner race formed of a pair of rings 20 and 21 having oppositely inclined bearing surfaces 22 on which are mounted two sets of rollers 23 and 24. The rings 20 and 21 forming the inner race are mounted on the wheel axle 25.

The rollers 23 and 24 engage oppositely inclined or conical bearing surfaces 28 and 29 of the outer bearing race 30. The bearing race 30 has inwardly extending ribs or flanges 31 at the side faces thereof which are provided with thrust surfaces 32 which take the end thrust of the rollers 23 and 24. The outer surface 33 of the outer bearing race 30 is spherical.

Figure 3:
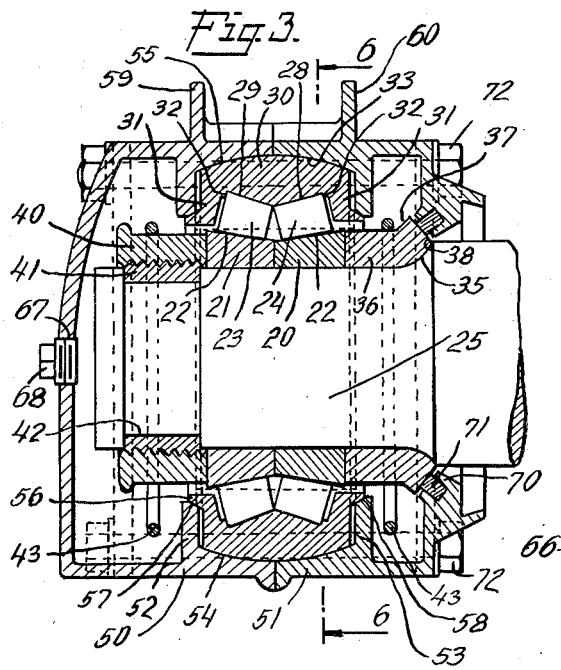
Fig. 3 is a vertical sectional elevation of a bearing constructed in accordance with the invention.
Figure 4:
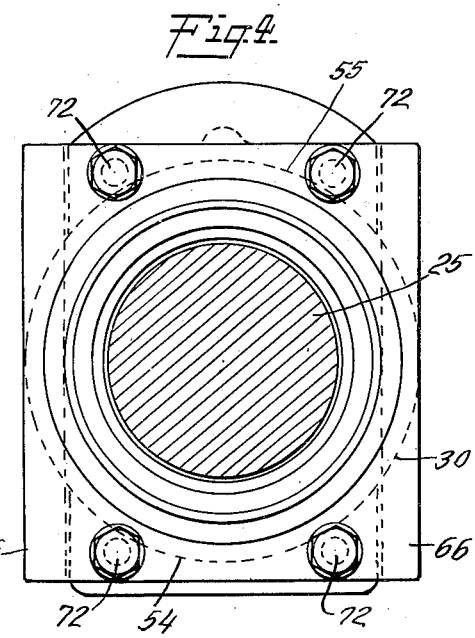
Fig. 4 is an end elevation of the structure shown in Fig. 3, the axle being shown in section.

The axle 25 as illustrated in Fig. 3 is reduced forming a shoulder 35 against which seats a collar 36 having an extension 37 at the inner end thereof provided with an arcuate end surface 38, the arc on which the surface 38 is formed being drawn about the center of the bearing as a center.

The inner ring 20 abuts against the collar 36 and the outer ring 21 of the inner race is engaged by a nut or threaded collar 40 which is threaded on a two-part or split threaded ring 41 mounted in an annular groove 42 formed adjacent the outer end of the axle.

Oil distributing rings 43 are preferably mounted on the outer surfaces of the nut 40 and collar 36.

The bearing illustrated in Figs. 3 to 6 inclusive is enclosed and mounted within a two-part casing formed of sections 50 and 51. The sections 50 and 51 have formed therein inwardly projecting webs 52 and 53 at the upper and lower ends thereof and have spherical inner surfaces 54 and 55 within which the outer race 30 is mounted. The race 30 has inwardly extending projections 56 provided with arcuate surfaces 57 which coact with correspondingly curved surfaces 58 formed on the inner edges of the webs 52 and 53. The curvatures of these surfaces are drawn about the center of the bearing as a center.

The sections 50 and 51 also have formed on the upper portions thereof outwardly extending parallel webs 59 and 60.

The sections 50 and 51 are so formed as shown in Fig. 5 that vertical surfaces 65 will fit between the portions 15 and 16 of the guide frames 11 and 12 of the pedestal and the sections are further provided with flanges 66 which secure the bearing casing in position to slide between the frames 11 and 12.

As shown in Fig. 5 when the bearing and the casing sections which enclose the bearing are mounted in position between the side frames or legs of the pedestal, the outer race 30 projects into the channel 17 formed in the frames between the portions 15 and 16.

The section 50 of the casing is provided with a filling opening 67 which is normally closed by a plug 68.

Casing 51 has an inwardly projecting portion 70 and a packing ring 71 is mounted between the portion 70 and the outer surface of the collar 36 for preventing the escape of lubricant from the bearing.

The sections 50 and 51 are secured together by bolts 72, the parts being so proportioned that the webs 52 and 53 will be properly positioned with respect to the projections 56 on the outer race 30.

The manner of assembling the bearing will be clear from the foregoing description but may be briefly described as follows. The inner section 51 is first placed around the axle 25 and the collar 36 is then placed in position. The inner and outer races and the rollers therebetween are then positioned around the axle and the split ring 41 is placed in the groove 42 and collar 40 is threaded on the ring, thus securing the parts in position. The other section 50 of the casing is then placed around the axle and the bolts 72 are inserted and the casing sections are secured together. The assembled bearing can then be inserted between the side frames 11 and 12 of the pedestal.

Figure 7:
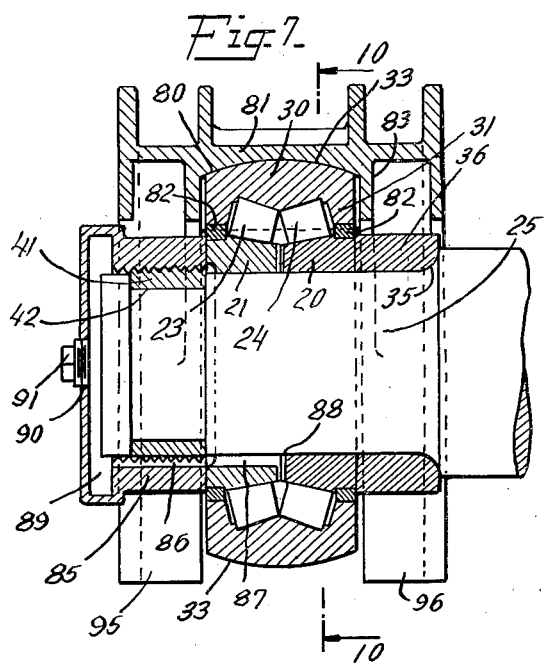
Fig. 7 is a sectional elevation similar to Fig. 3, but illustrating another form of device constructed in accordance with the invention.
Figure 8:
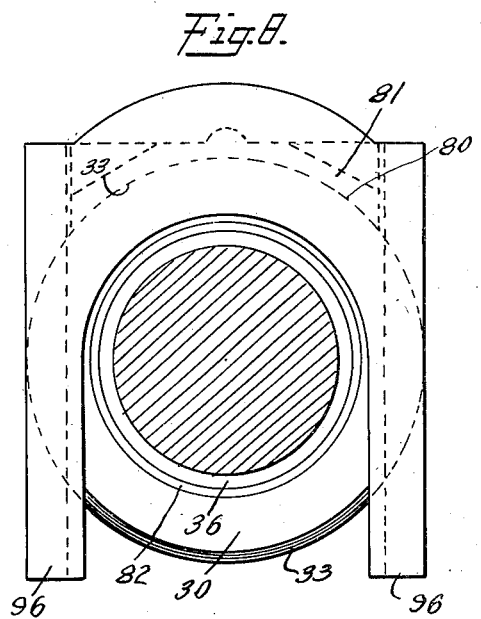
Fig. 8 is an end elevation of the structure shown in Fig. 7, the axle being shown in section.

The form of the invention illustrated in Figs. 7 to 10 inclusive is similar to the embodiment shown in Figs. 3 to 6 but differs therefrom in that the bearing is carried by a one piece yoke instead of a two piece casing. In Fig. 7, the roller bearing comprises an inner race made up of two sections 20 and 21, two sets of rollers 23 and 24 and an outer race 30. The inner race is mounted on the axle 25 and the outer surface 33 of the outer race is spherical and engages at the upper end of the bearing, a spherical inner surface of a central portion 80 of a one piece saddle or yoke 81.

Packing rings 82 are placed between the inwardly extending portions 31 of the outer race 30 and the outer surfaces of the sections 20 and 21 of the inner race for the purpose of preventing the escape of lubricant from the bearing.

The yoke 81 is formed with inwardly projecting parallel webs 83 disposed adjacent to but spaced from the side edges of the outer race 30.

The collar 36 is mounted on the axle 25 against the shoulder 35 and the bearing is held against the collar 36 by a threaded nut or sleeve 85 which is threaded on the split or two-part ring 41 mounted in an annular groove 42 formed in the axle. The nut or sleeve 85 has a longitudinal conduit or groove 86 which communicates with an oil conduit 87 formed in the section 21 of the inner race. The conduit 87 conducts lubricant to a central opening 88 formed between the sections 20 and 21 through which lubricant is conducted to the rollers. A pocket 89 is formed in the end of the nut or sleeve 85 and receives lubricant through an opening 90 normally closed by a plug 91.

The yoke 81 comprises a pair of U-shaped frames 95 and 96 which are connected at their upper ends by the central portion 80 above referred to. The frames 95 and 96 are adapted to fit between the inner surfaces of the portions 15 and 16 of the pedestal frames 11 and 12 and are provided with flanges 97 which engage the outer faces of the portions 15 and 16 and secure the bearing in position between the frames 11 and 12 and in sliding relation thereto. If desired, the yoke can be fixedly secured between the frames 11 and 12.

From the showing in Fig. 7 it will be noted that the webs 83 do not extend entirely around the axle and bearing but only around substantially one-half of the axle and bearing. In other words, the yoke or saddle 81 is so formed that the bearing can be slipped in from below between the legs of the U-shaped frames 95 and 96.

Figure 9:
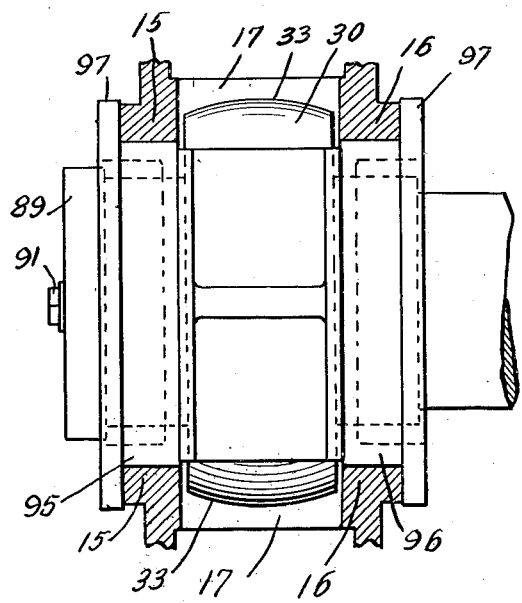
Fig. 9 is a view partly in section and partly in top plan showing the bearing illustrated in Fig. 7.
Figure 10:
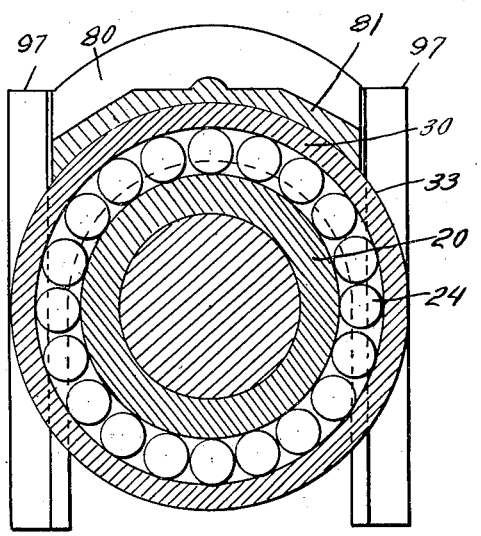
Fig. 10 is a vertical sectional elevation taken substantially on line 10—10 of Fig. 7.

From the showing in Fig. 9 it will be seen that the outer race 30 extends into the groove 17 between the portions 15 and 16 of the side frames 11 and 12. The parts are so proportioned that the outer ring can rotate in this channel or groove as well as within the central portion 80 of the saddle 81.

The method of assembling the bearing shown in Figs. 7 to 10 inclusive will be clear from the foregoing description but may be briefly described as follows. The collar 36, inner race 20, 21, split ring 41 and threaded sleeve or nut 85, rollers 23, 24 and outer race 30 are first mounted on the axle. The saddle 81 is then slipped over the bearing through the open lower ends of the U-shaped frames 95 and 96 and the saddle having the bearing therein is then mounted between the frames 11 and 12 of the pedestal.

In both forms of the invention illustrated, the axle can tilt to a slight extent with reference to the bearing mounting by reason of the spherical outer surface of the outer race 30 and the corresponding inner surface of the bearing mounting which engages the outer race 30 at the upper end thereof.

In the form of the invention shown in Figs. 3 to 6 inclusive, the arcuate engaging surfaces of the projections 56 on the outer race and the inner edges 58 of the webs 52 and 53 permit such tilting movement. Furthermore, the curved or arcuate surfaces 38 on the collar 36 facilitate the tilting movement.

From the foregoing description it will be seen that a simple and practical roller bearing and mounting therefor have been designed and it will be evident that the structure comprises a minimum number of parts and by reason of the design of the structure, the bearing can be easily and readily assembled or mounted.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a pedestal having a pair of inwardly facing frame members, a roller bearing mounting comprising a one piece yoke slidably supported between said side frames and a roller bearing including an outer race having a spherical outer surface engaging and tiltably mounted in said yoke.

2. In combination, a pedestal having a pair of inwardly facing frame members, a roller bearing mounting comprising a one piece yoke slidably supported between said side frames and a roller bearing mounted in and having an outer race engaging said yoke.

3. In combination, a pedestal having a pair of inwardly facing frame members, a yoke comprising a pair of inverted U-shaped frames connected at their upper ends by a central portion, said yoke being slidably mounted between said frame members and a roller bearing mounted in said yoke and having an outer race engaging said central portion.

4. In combination, a pedestal having a pair of inwardly facing frame members, a yoke comprising a pair of inverted U-shaped frames connected at their upper ends by a central portion having inwardly extending substantially parallel webs, said yoke being slidably mounted between said frame members and a roller bearing mounted in said yoke and having an outer race engaging said central portion and disposed between said webs.

5. In combination, a pedestal having a pair of inwardly facing frame members, a yoke comprising a pair of inverted U-shaped frames connected at their uper ends by a central portion having a spherical inner surface, said yoke being slidably mounted between said frame members and a roller bearing mounted in said yoke and having an outer race provided with a spherical outer surface engaging the spherical surface of said central portion.

6. In combination, a pedestal having a pair of inwardly facing frame members, a yoke slidably supported in said frame members, and a roller bearing mounted in said yoke, said bearing comprising an inner race having oppositely inclined conical surfaces, two sets of conical rollers mounted on said inner race, and an outer race having oppositely inclined conical surfaces engaging said rollers, said outer race having an outer spherical surface engaging a correspondingly curved surface on the yoke.

7. In combination, a pedestal having a pair of inwardly facing frame members, a roller bearing mounting comprising a yoke open at one end and supported between said side frames and a roller bearing mounted in said yoke.

8. In combination, a pedestal having a pair of inwardly facing frame members, a roller bearing mounting comprising a yoke open at one end and supported between said side frames and a roller bearing having an outer race tiltably mounted in said yoke.

9. In combination, a pedestal having a pair of inwardly facing frame members, a roller bearing mounting comprising a one piece yoke supported between said side frames and a roller bearing mounted in and having an outer race engaging said yoke.

10. In combination, a pedestal having a pair of inwardly facing frame members, a yoke comprising a pair of inverted U-shaped frames connected at their upper ends by a central portion having inwardly extending substantially parallel webs, said yoke being mounted between said frame members and a roller bearing mounted in said yoke and having an outer race engaging said central portion and disposed between said webs.

11. In combination, a pedestal having a pair of inwardly facing frame members, a yoke comprising a pair of inverted U-shaped frames connected at their upper ends by a central portion having a spherical inner surface, said yoke being mounted between said frame members and a roller bearing mounted in said yoke and having an outer race provided with a spherical outer surface engaging the spherical surface of said central portion.

12. In combination, a pedestal having a pair of inwardly facing frame members, a yoke supported in said frame members, and a roller bearing mounted in said yoke, said bearing comprising an inner race having oppositely inclined conical surfaces, two sets of conical rollers mounted on said inner race, and an outer race having oppositely inclined conical surfaces engaging said rollers and having an outer surface tiltably engaging said yoke.

13. In combination, a pedestal comprising two sets of inwardly facing side frames, each set consisting of a pair of substantially parallel spaced frame members, and a roller bearing mounted between said sets of side frames and having an outer bearing race projecting between the frame members of each set and spaced therefrom.

14. In combination, a pedestal comprising two sets of inwardly facing side frames, each set consisting of a pair of substantially parallel spaced frame members, and a roller bearing mounted between said sets of side frames and having an outer bearing race projecting between the frame members of each set and freely rotatable therebetween.

15. In combination, a pedestal comprising two sets of inwardly facing side frames, each set consisting of a pair of substantially parallel spaced frame members, a yoke slidably mounted between said sets of frames, and a roller bearing mounted in said yoke and between said sets of side frames and having an outer bearing race projecting between the frame members of each set and spaced therefrom.

In witness whereof, I have hereunto set my hand this 3rd day of June, 1927.

WILHELM B. BRONANDER.